United States Patent

[11] 3,566,091

| [72] | Inventors | Theodosios Bay<br>Lansdale;<br>Charles W. Ross, Hatboro, Pa. |
|---|---|---|
| [21] | Appl. No. | 577,032 |
| [22] | Filed | Sept. 2, 1966 |
| [45] | Patented | Feb. 23, 1971 |
| [73] | Assignee | Leed & Northrup Company<br>Philadelphia, Pa. |

[54] METHOD AND APPARATUS FOR CONTROLLING A PROCESS VARIABLE BY MANIPULATION OF A SELECTED ONE OF TWO VARIABLES
28 Claims, 6 Drawing Figs.

[52] U.S. Cl. ................................................. 235/151.1;
263/32
[51] Int. Cl. ....................................................... G05l 11/01
[50] Field of Search........................................ 235/151.1,
151.12, 151; 263/32; 236/(Computer Digest);
23/253 (A), 279; 203/22 (Inquired)

[56] References Cited
UNITED STATES PATENTS

| 2,292,243 | 8/1942 | Schwartz................. | 263/32 |
| 3,075,700 | 1/1963 | Bishop..................... | 235/151.1(X) |
| 3,300,196 | 1/1967 | Bendy...................... | 263/53(X) |
| 3,381,946 | 5/1968 | Ross........................ | 235/151(X) |
| 3,387,282 | 6/1968 | Jacques.................... | 235/151.1(X) |

*Primary Examiner*—Eugene G. Botz
*Attorneys*—William G. Miller, Jr. and Raymond F. MacKay ABSTRACT: A method and means for controlling a rotary kiln so as to maintain the desired temperature in the burning zone utilizes a selected one of two variables to effect the control. The burning zone temperature is controlled by controlling the speed of the kiln or by controlling the firing rate. The system is specifically designed to provide an arrangement for determining whether the control will be effected by a change in firing rate. Also, the amount of proportional action which is utilized in the control and the decision as to whether or not rate and reset action will be applied is determined by the logic of the system. An anticipatory control from CO is provided. The control system is so organized that proportional action may be doubled when the burning zone temperature is above or below a predetermined limit. Also, rate action is incorporated in the control only when the burning zone temperature is decreasing below a certain high limit or increasing above a certain low limit and reset action is utilized only within predetermined limits.

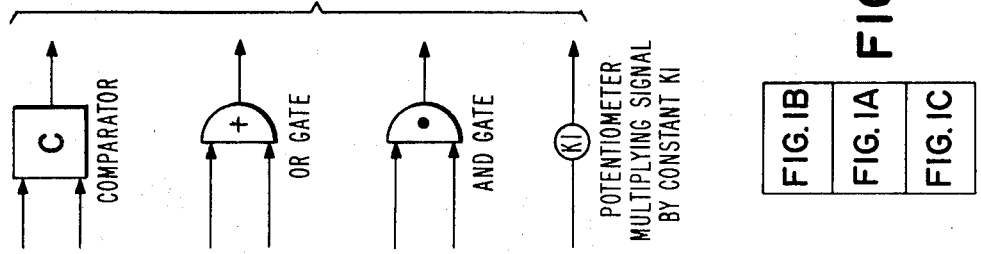
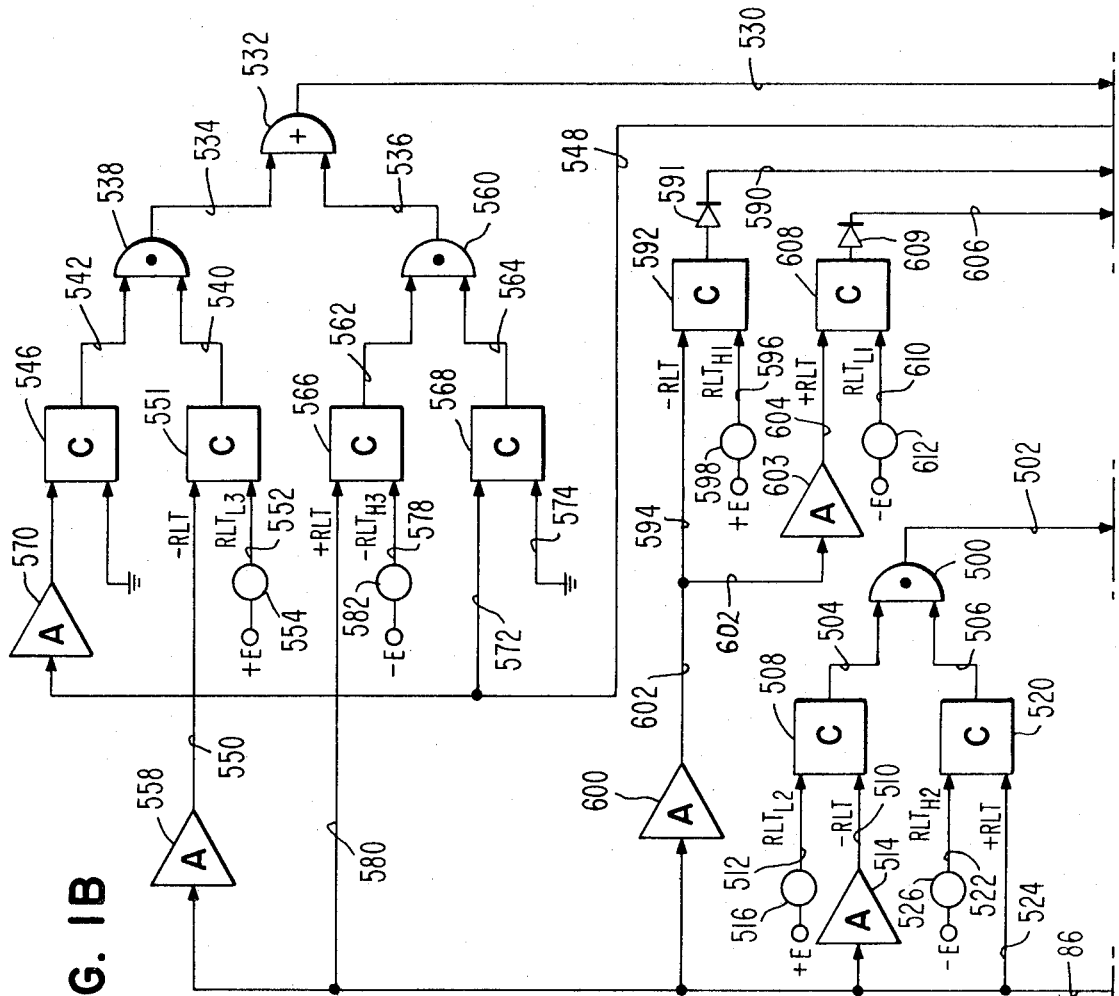

METHOD AND APPARATUS FOR CONTROLLING A PROCESS VARIABLE BY MANIPULATION OF A SELECTED ONE OF TWO VARIABLES

In the past, the temperature in the burning zone has normally been maintained solely by the control of the firing rate of the kiln or solely by a variation in the rate at which the kiln rotates and hence the rate at which the material is translated through the kiln. Both of these approaches to control of the burning zone temperature have required certain restrictions on other conditions of the kiln which themselves require control. It has been found that these methods of temperature control have left much to be desired in the necessary flexibility in the kiln operation as required for the production of a quality product at a maximum production rate.

It is, therefore, an object of this invention to provide an improved method and means for controlling a single measured variable by manipulating a selected one of two manipulated variables.

It is a further object of this invention to provide an improved method and means for controlling a single variable by manipulating a selected one of two manipulated variables with the selection being effected so as to prevent conditions of the process which are subject to variation by changes in the manipulated variables from exceeding preestablished constraints on those conditions.

It is further an object of this invention to provide an improved method and means for the control of the temperature of the product being processed in a rotary kiln.

A still further object of this invention is the provision of a method and means for determining which of the available manipulated variables should be controlled to most effectively control the clinker temperature in the burning zone of a rotary cement kiln under varying kiln conditions.

Still another object of this invention is the provision of a method and means for determining the control functions to be employed and the extent to which they should be employed in the control of the clinker temperature in the burning zone of a rotary cement kiln.

In accordance with this invention, there is provided a method and means for controlling a process in which at least two manipulated variables may be used to control a single measured variable in a process where constraints are required on the allowable variation of certain process conditions subject to modification by the manipulated variables. The method includes the production of an error signal representative of the deviation of the measured variable from its desired value and the production from that error signal of another signal representative of the rate of change of the error signal. From the rate of change signal there is produced a control signal of magnitude indicative of the amount of control action required for a preferred one of the manipulated variables and there is produced a selection signal for selecting the variable to be controlled. The variable selected will be other than the preferred variable when the control action called for by the control signal is of magnitude and direction such that control of the the preferred variable could cause conditions of the process to exceed their preestablished constraints and when the control of the other variable would be such that the other variable would be controlled toward the its set point. When the selected variable is not the preferred variable, there is produced from the rate of change signal a control signal for that other variable. The selected manipulated variable is then controlled in response to the control signal produced for the selected manipulated variable.

A more detailed understanding of this invention as it is applied to a rotary cement kiln may be had from the following description in conjunction from the drawings in which like reference characters identify like elements.

FIG. 1 is a diagram showing the manner in which 1A, 1B, and 1C should be oriented to form a complete circuit diagram of one form of the novel control system. FIGS. 1A, 1B, and 1C are each a portion of a circuit diagram exemplifying one form of the invention.

FIG. 1D shows the symbols used in FIGS. 1A, 1B, and 1C for particular circuit elements.

Figure 1A:
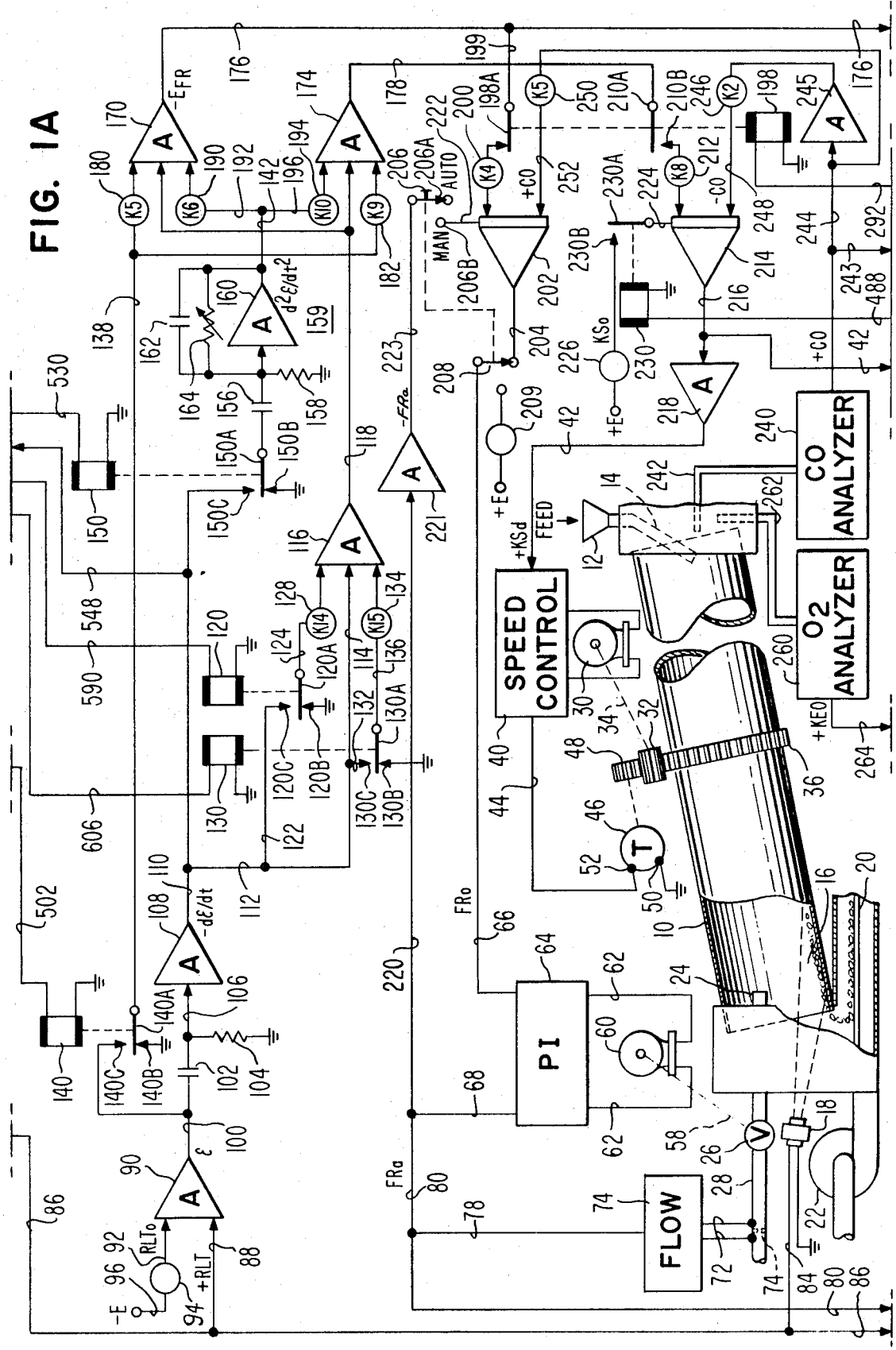

In FIG. 1A the rotary kiln 10 is shown with its lower or discharge end to the left and its upper or feed end to the right. The raw material is normally fed into the kiln through the feed hopper 12 and its associated discharge pipe 14 which carries the raw material into the rotating kiln 10 where the raw material is gradually translated along the length of the kiln toward the discharge end. While being so translated, it is carried through a burning zone 16 at which point the temperature of the clinker being formed is measured by the sighting of the radiation pyrometer 18 on the clinker. As is evident from FIG. 1A, the clinker after passing to the discharge end of the kiln falls onto grate 20 in the kiln cooler in which the clinker is cooled by the introduction of air by means of the forced draft fan 22.

The temperature of the clinker in the burning zone 16 is maintained in accordance with this invention by either the control of the fuel feed rate to the burner 24 by adjustment of valve 26 in the fuel feed line 28 or by the control of the rate of rotation of the kiln or, in other words, the kiln speed.

As will be evident in FIG. 1A, the kiln 10 is rotated by kiln drive motor 30 turning the gear 32 through the mechanical coupling 34. The gear 32 in turn rotates the kiln by virtue of its engagement of the ring gear 36 attached to the kiln.

The control of the speed of motor 30 is carried out by the speed control 40 shown in FIG. 1A as a block which receives as an input signal a signal representing the desired kiln speed. This signal appears on line 42. The speed control also receives as another input signal a signal on line 44 from tachometer 46 which is indicative of the actual kiln speed. Tachometer 46 is shown as being connected by its drive gear 48 to gear 32 so that the potential produced by tachometer 46 between the ground terminal 50 and terminal 52 is representative of the actual kiln speed.

It will be evident to those skilled in the art that the kiln speed controller 40, which is shown as a block, could be any of a number of well-known controllers.

In FIG. 1A the control of the opening of valve 26 in the fuel feed line 28 is effected by the position of shaft 58 of motor 60 in response to control signals over lines 62 from controller 64. Controller 64 is shown as a block PI indicating that the block represents any of a number of well-known controllers which provide both proportional and integral control action in response to deviation of the input signals thereto.

The input signals to controller 64 are shown as a signal representing the set point $FR_o$, which appears on line 66, and a signal $FR_a$, which appears on line 68. The signal $FR_a$ represents the actual fuel feed rate as measured by flowmeter 70, shown in FIG. 1A as being connected to pressure taps 72 on opposite sides of the orifice 74. The flowmeter 70 thus produces a signal on line 78, the connecting line 80 and line 68 which is representative of the actual fuel feed rate.

For clarity of description, there is provided below a list of symbolic terms to be used in the subsequent description along with the definitions of each of these terms.

RLT—clinker temperature in burning zone detected by radiation pyrometer.
$RLT_0$—set point for clinker temperature.
$RLT_{H1}$—high limit for clinker temperature above which proportional action is increased.
$RLT_{L1}$—low limit for clinker temperature below which proportional action is increased.
$RLT_{H2}$—high limit for clinker temperature above which reset action is discontinued.
$RLT_{L2}$—low limit for clinker temperature below which reset action is discontinued.
$RLT_{H3}$—high limit for clinker temperature below which rate action is introduced when temperature is decreasing.
$RLT_{L3}$—low limit for clinker temperature above which rate action is introduced when temperature is increasing.

$FR_a$—actual rate of flow of fuel to burner.
$FR_H$—high limit for rate of flow of fuel to burner.
$FR_L$—low limit for rate of flow of fuel to burner.
$FR_O$—set point for rate of flow of fuel to burner.
KEO—measured oxygen concentration in kiln exit.
$KEO_L$—low limit for kiln exit oxygen.
$KS_d$—desired value as calculated for kiln speed.
$KS_H$—high limit for kiln speed.
$KS_O$—set point for kiln speed.
CO—carbon monoxide concentration in kiln exit.
$CO_H$—limit of concentration for carbon monoxide (usually zero).
$\epsilon$ —temperature error computed as difference between RLT and $RLT_O$.
$E_{FR}$—change in fuel rate called for by control system.

The novel system of control here described is effective to provide at all times a signal on line 42, $KS_d$, representing the desired kiln speed as well as a signal on line 66, $FR_O$, representing the desired firing rate or fuel feed rate as a set point for controller 64. Depending upon the kiln conditions, the temperature detected by radiation pyrometer 18 will be subject to control by variation of either the signal on line 66 or the signal on line 42. In the preferred embodiment of this invention the signal on line 66 representing the preferred variable will be the signal which will be varied to maintain the burning zone temperature with resort being had to a variation of the signal of line 42, which represents the other variable, only when the conditions or constraints or the kiln operation including those conditions relating to the kiln control system, such as the availability of certain measurements, will not allow the toleration of variations in the fuel feed rate necessary for maintaining temperature control.

The subsequent description will show the manner in which the signals provided on line 66 and line 42 are obtained in one embodiment of this invention.

With reference to FIG. 1A there will now be described the manner in which there is produced proportional control signals, reset control signals, and rate control signals which can be combined to provide the signal on line 66 or the signal on line 42, depending upon whether the fuel feed rate or the kiln speed has been selected by the circuitry of FIG. 1C as being the manipulated variable to be utilized for control of the burning zone temperature. There will also be described the means by which the circuits of FIG. 1B selectively exclude from these signals the reset or rate action called for or cause a modification of a proportional action called for in dependence upon the relationship of the temperature in the burning zone and certain limit values preset for establishing the type of control to be effected at various deviations of the burning zone temperature from its desired value.

As shown in FIG. 1A, the radiation pyrometer 18 has one of its terminals connected to ground and the other by way of line 84 to line 86 which is in turn connected to line 88 as an input to operational amplifier 90. The input signal representing the temperature measured by the radiation pyrometer introduced on line 88 to amplifier 90 is shown as +RLT. This signal is compared with the signal introduced on the other input to amplifier 90; namely, line 92 which signal is identified as $RLT_O$ and represents the set point or desired value for the temperature in the burning zone of the kiln 10. The signal $RLT_O$ is established as an output from potentiometer 94 whose input on line 96 is derived from a source of potential —E. For the purpose of this description, it will be assumed that the operational amplifiers utilized in the circuit are effective not only to carry out the operation for which they are designed but also at the same time effectively invert the sign of the signal.

The output of amplifier 90 represents the difference between the actual measured temperature in the burning zone and the desired temperature, and is, therefore, a signal representing the error $\epsilon$ which appears on output line 100.

The error signal is differentiated by a series capacitor 102 and a shunting resistor 104, which is connected from the input line 106 of operational amplifier 108 to ground. The output of amplifier 108 is a signal representing $-d\epsilon/dt$ on line 110. The signal on line 110 is introduced by way of line 112 and line 114 as an input to operational amplifier 116 so as to produce on the output line 118 of that amplifier a proportional control signal. This proportional control signal is enhanced selectively by the addition of other input signals to operational amplifier 116, as when there is energization of relay 120 to move its contact 120A from the grounded lower stationary contact 120B to the upper contact 120C. The signal on line 112 is connected to line 122, contact 120C and contact 120A to input line 124, which introduces through potentiometer 128 another input signal to amplifier 116 which represents the product of the proportionality factor of potentiometer 128; namely, K14 and the signal $-d\epsilon/dt$.

Similarly, the energization of relay 130 is effective to cause the movable contact 130A to connect to stationary contact 130C to thereby introduce by way of line 132 a signal to potentiometer 134 and line 136 to introduce as another input to amplifier 116 a signal representative of the product of the multiplication constant K15 of potentiometer 134 and the signal $-d\epsilon/dt$.

It will thus be evident that by energization of relay 120 the proportional control signal on line 114 will be enhanced by the addition of a signal K14 ($-d\epsilon/dt$) whereas the energization of relay 130 will cause the proportional control signal to be enhanced by the addition of the signal K15 ($-d\epsilon/dt$).

The reset control signal is provided by a signal on line 138, which is connected to line 100 when relay 140 is energized, so as to provide contact between its movable contact 140A and the upper stationary contact 140C, whereas the contact 140A is as shown when relay 140 is deenergized; namely, in contact with the grounded contact 140B.

The rate control signal is provided on line 142 and is derived by differentiating the signal on line 110 so as to obtain a signal $d^2\epsilon/dt^2$ whenever the relay 150 is energized to provide the contact between its movable contact 150A and its upper stationary contact 150C instead of the normal deenergized contact between 150A and the lower grounded stationary contact 150B. The circuit 154 is effective to differentiate the signal derived from line 110. This circuit includes a capacitor 156 and a shunting resistor 158 on the input of operational amplifier 160 while the feedback circuit of the amplifier 160 includes in shunt connections the capacitor 162 and a variable resistor 164.

Since the control of the fuel feed rate and the control of the kiln speed may require control signals having different reset rates and different rate times, the proportional, reset, and rate control signals are combined by the use of the separate operational amplifiers 170 and 174 so that there is provided as an output from amplifier 170 on line 176 a signal indicative of the control to be effected on the fuel feed rate when that manipulated variable is the selected one. Likewise, the output signal from amplifier 174 on line 178 represents the control signal indicative of the control to be effected on the kiln speed when that manipulated variable is the selected one.

The potentiometer 180 introduces constant K5 which determines the reset rate for the fuel feed control since it serves to modify the signal on line 138 before it is introduced as an input to amplifier 170. Likewise, potentiometer 182 establishes the constant K9 as the reset rate for the kiln speed control signal since it modifies the signal on line 138 as supplied to line 184 and to potentiometer 182, thus modifying the resulting input signal to amplifier 174.

In similar fashion, to establish the rate time the constant K6 is introduced by potentiometer 190, which appears in the input line 192 to amplifier 170 and, therefore, modifies the control signal for the fuel feed rate. The rate time for the control signal controlling kiln speed is adjusted by the setting on potentiometer 194, shown in FIG. 1A as a constant K10. The potentiometer 194 is in line 196 which is connected with line 142 to introduce the rate signal into amplifier 174.

The signal on line 176, symbolically represented as $-E_{FR}$, is the control signal derived for controlling fuel feed rate when that is selected to be the manipulated variable. The selection of the fuel feed rate as the manipulated variable is effected by the relay 198 being in the deenergized state so that the movable contact 198A is operative to connect line 176 through line 199 to input potentiometer 200 which modifies the control signal on line 199 by constant K4, representing the controller gain. The output of potentiometer 200 provides an input to the integrating amplifier 202 which in turn provides on its output line 204 the signal $FR_0$. Line 204 is connected to line 66 whenever the manual-auto switch 206 is in the position shown; namely, the automatic position, or, in other words, that position required for automatic control of the burning zone temperature. It will be evident that when the manual-auto switch 206 is depressed, the movable contact 208 will then connect line 66 to a potentiometer 209 which is connected to a source of potential +E so as to establish a fixed set point $FR_0$ as determined by the setting of potentiometer 209.

It will also be noted that when the control system is put in the manual operating condition by manually operating switch 206 to the depressed position, its movable contact 206A is in contact with the fixed contact 206B which serves to connect the signal derived from line 220 by way of sign reversing amplifier 221 and line 223 to the reset line 222 of integrating amplifier 202 so that the output of amplifier 202 on line 204 will be determined by the signal $-FR_a$ whenever the system is on manual operation.

Upon energization of relay 198, the kiln speed is selected as the manipulated variable instead of the fuel feed rate, and, therefore, the control signal on line 178 must be made the effective control signal. This is accomplished by the relay 198 causing the movable contact 210A to come into contact with lower stationary contact 210B so as to connect line 178 to potentiometer 212 whose output line is connected to the integrating amplifier 214 as an input thereto potentiometer 212 introducing the constant K8 as a gain factor for the kiln speed control. The output of amplifier 214 appears on line 216 and has its sign changed by sign changing amplifier 218 to provide on line 42 the signal $KS_d$ representing the desired kiln speed.

The resetting signal introduced on line 224 to integrating amplifier 214 is a signal $KS_0$ derived from potentiometer 226 which is in turn connected to a source +E. The signal $KS_0$ represents the kiln speed set point which is desired whenever kiln speed is not selected as the manipulated variable for controlling the burning zone temperature. Thus relay 230 will normally energize to disconnect the movable contact 230A from stationary contact 230B whenever kiln speed is the selected manipulated variable, as will be later explained.

It is desirable in the control of the temperature of the burning zone of cement kilns to provide an anticipatory control in accordance with the carbon monoxide detected in the kiln exit. To this end there is provided in FIG. 1A a carbon monoxide analyzer 240 which has a sample line 242 inserted in the exit area of the kiln and which provides on line 244 a signal +CO to provide through potentiometer 250, introducing a constant K1, and its associated output line 252 a compensating signal which is effective to cause a reduction in fuel feed rate to compensate for the presence of CO. This signal is introduced as an input to amplifier 202. A feedforward signal for modifying the kiln speed to compensate for the anticipated effect of the change in fuel feed rate is supplied by way of inverting amplifier 245 to potentiometer 246. The magnitude of the feedforward signal depends upon the constant K2 introduced by potentiometer 246 in the input line 248 of amplifier 214.

In FIG. 1A there is also shown an oxygen analyzer 260 which obtains a gas sample through sample line 262 from the exit area of the kiln so as to provide on its output line 264 the signal +KEO representing the kiln exit oxygen concentration which measurement will be utilized as subsequently described.

Figure 1C:
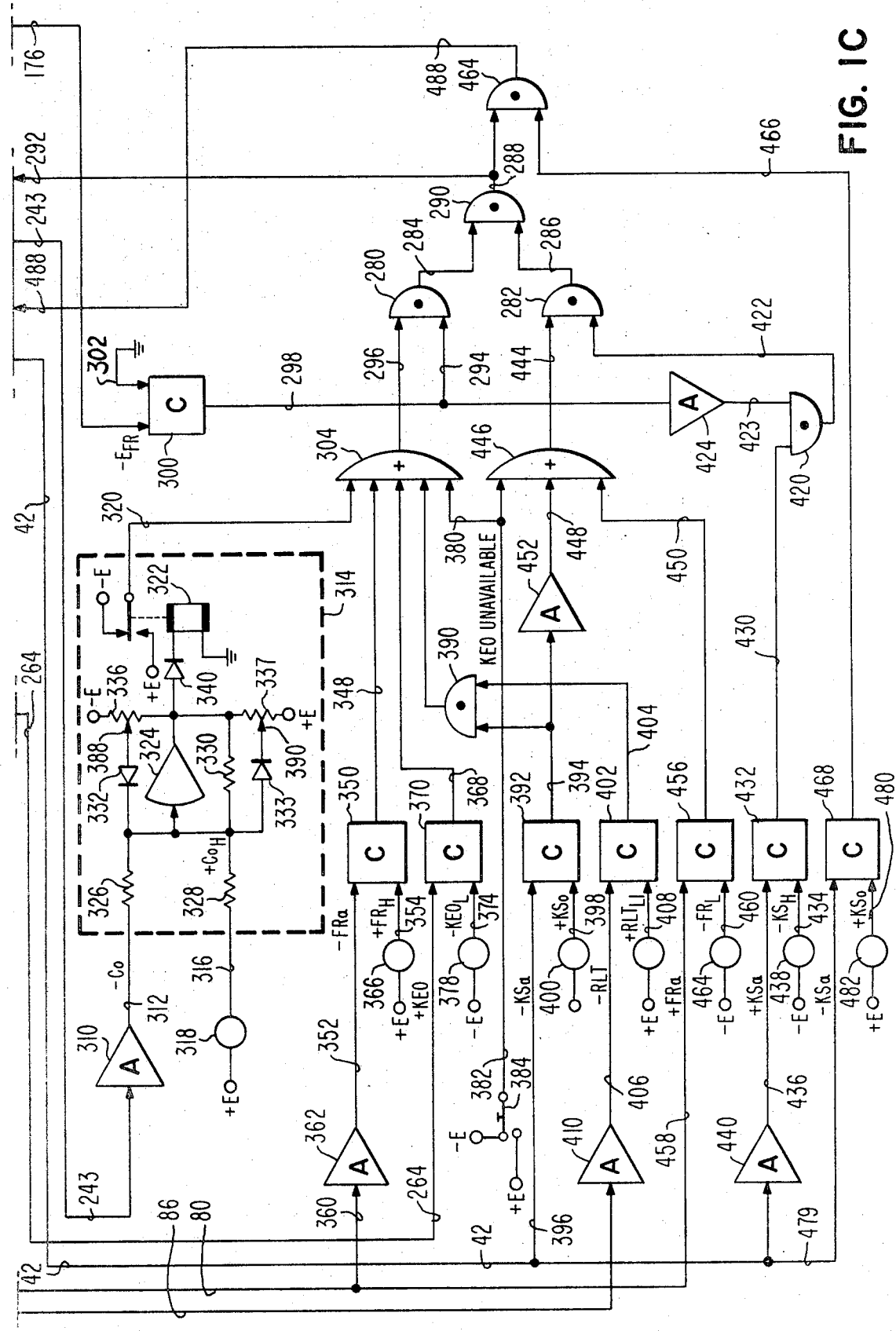

In FIG. 1C there is shown in logic diagram form the necessary circuitry for determining in accordance with the several conditions of the kiln when it is desirable to switch from control of the fuel feed rate to control of the kiln speed as a means of regulating the burning zone temperature. Thus, the circuitry of FIG. 1C is essentially for the purpose of selectively establishing an energized state for relay 198 of FIG. 1A under certain kiln conditions. Essentially the circuit of FIG. 1C is designed to cause the switching of control from fuel feed rate to kiln speed whenever an increase in the fuel feed rate is called for by the control signal controlling the fuel feed rate and when either the oxygen measurement is not available for use in control of the system or the oxygen, carbon monoxide, or fuel feed rate are beyond their preset limits or when the desired kiln speed called for is above the set point at the same time the temperature in the burning zone is above a preset low limit. Alternatively switching from fuel feed rate to kiln speed control whenever a decrease in fuel feed rate is called for occurs when the desired kiln speed called for is below the high limit and either desired kiln speed is below its set point, actual fuel feed rate is below its low limit, or the oxygen measurement is unavailable. The eight different combinations of kiln conditions required to effect a switching of control from fuel feed rate to kiln speed are shown by the following table:

COMBINATIONS INITIATING KILN SPEED CONTROL

| Kiln condition No. | 1 | 2 | 3 | 4 | 5 | 6 | 7 | 8 |
|---|---|---|---|---|---|---|---|---|
| $E_{FR}>0$ | X | X | X | X | X | | | |
| $E_{FR}<0$ | | | | | | X | X | X |
| $KS_d>KS_0$ | | | X | | | | X | |
| $KS_d<KS_0$ | | | | | | | X | |
| KEO unavailable | | X | | | | | | X |
| $RLT>RLT_{LL}$ | | | | X | | | | |
| $KEO<KEO_L$ | | | | | X | | | |
| $CO>CO_H$ | | | | | | X | | |
| $FR_a>FR_H$ | | | | | | X | | |
| $FR_a<FR_L$ | | | | | | | | X |
| $KS_d<KS_H$ | | | | | | X | X | X |

The manner in which these several alternate combinations of conditions cause the switching from fuel feed rate control to kiln speed control will be more evident upon consideration of the operation of FIG. 1C. In FIG. 1C the gates 280 and 282 which are AND gates for positive signals are designed to produce a positive signal on the one of the respective output lines 284 and 286 whenever both input signals on either gate are positive. The result of the appearance of a positive signal on either lines 284 or 286 is to produce on the output line 288 of OR gate 290 a positive signal which will be effective through line 292 to cause an energization of relay 198.

As indicated, the conditions required to provide an output signal on line 284 from gate 280 is the existence of positive signals on both of the input lines 294 and 296. A positive signal on line 294 will result from a positive signal being generated on the output line 298 of the comparator 300 whenever the signal on line 176 ($-E_{FR}$) is greater in magnitude than the other input signal to the comparator 300; namely, the ground connection to line 302. Since there is effectively a sign change effected by the circuit of the comparator 300 whenever the signal $-E_{FR}$ representing the magnitude of the control signal for controlling the fuel rate is less than zero, a positive signal will appear on line 298.

The line 296 will also have a positive signal appearing on it whenever one of the inputs to the OR gate 304 is positive. The several possible conditions which will provide a positive input to the OR gate 304 will now be considered. The first condition which will produce such a positive signal is the existence of a signal on line 243 of a positive polarity indicating the presence of carbon monoxide in the kiln exit. The signal on line 243 has its polarity changed by amplifier 310 so that there is produced a negative signal on line 312 as one of the input signals to comparator 314 shown as a circuit enclosed in the dashed-line block. The other input to the comparator is by way of line 316 from potentiometer 318 which is adjusted to provide the desired signal on line 316 indicative of the limit which can be tolerated on the concentration of CO in the kiln exit; namely, $CO_H$. The potentiometer 318 is supplied by a voltage +E. Normally, the adjustment of potentiometer 318 will be such that the signal $+CO_H$ will be zero since usually it is desirable that no carbon monoxide be detected in the kiln exit.

The comparator 314 has its circuit shown in detail. This comparator exemplifies the circuit which may be utilized in the other comparators such as comparator 300, which is shown in symbolic block form.

An examination of the circuit of comparator 314 shows that it is essentially an amplifier for actuating a relay in response to a comparison of the absolute value of the input signals which are usually of opposite sign, thus the inputs to comparator 314 are the signals −CO on line 132 and +$CO_H$ on line 316. Whenever the signal −CO is greater in magnitude than the signal +$CO_H$, the output of the comparator 314 produced on line 320 will be positive; namely, +E as a result of the energization of relay 322 to disconnect the negative potential of −E from line 320 and connect the line 320 to the positive source +E. The energization of relay 322 results from a production of a positive output signal on the high gain amplifier 324. The amplifier 324 has input resistors 326 and 328 connected to the respective input lines 312 and 316 and the amplifier is effective through either its feedback resistor 330 or the feedback diode 332 to provide a feedback current canceling the input current so that the net current in the input circuit of amplifier 324 is maintained at substantially zero.

In the feedback circuit including diode 332 there is included a resistor 336 connected at one end to a source −E and at its other end to the output line of amplifier line 324. Whenever the output of amplifier 324 is such that the tap 338 on resistor 336 is above a zero potential, the diode 332 is forward biased to carry current to the input circuit of amplifier 324. The effect of such a current is to prevent saturation of amplifier 324 so that upon a change in input signals in one direction the state of the output of the amplifier can be quickly changed. To also allow for quick changes in the other direction, diode 333 provides a current path from the amplifier input to contact 390 on resistor 337. The resistor 337 connects the amplifier output to a source +E, as shown. In the output circuit of amplifier 324 there is inserted a diode 340 which allows current from the amplifier 324 to flow to the relay 322 to energize that relay. The other relay connection is connected to ground as shown in FIG. 1C. Therefore, relay 322 is energized only when the input signal on line 312 has an absolute value greater than that on line 316.

Another condition which will provide a positive signal on line 296 is the condition in which the actual fuel feed rate $FR_a$ is greater in magnitude than the preset high limit established for that rate. Such a condition will cause a positive signal to appear on line 348 as an output from the comparator 350 when the signal −$FR_a$ on line 352 is greater than the signal +$FR_H$ on line 354. The signal on line 352 is derived from the signal appearing on line 80 by way of a connection through line 360 and sign changing amplifier 362. The signal on line 354 is derived from a source +E as modified by potentiometer 366 which may be adjusted to obtain the desired signal on line 354 for representing the high limit for the fuel feed rate.

Still another condition which will provide a positive signal on line 296 is the existence of a positive signal on line 368 as an output from comparator 370 resulting from the signal KEO, representing the kiln exit oxygen concentration, being less than its low limit as represented by −$KEO_L$. These signals are respectively represented by positive potential on input line 372 and the magnitude of the potential on line 374. The positive potential on line 372 representing +KEO is derived from line 264 while the signal on line 374 is derived from the negative source −E by way of the adjustable potentiometer 378.

Another condition which will provide a positive output from OR gate 304 is the existence of a positive signal on line 380, which is connected to line 382 which in turn derives its potential from either the source −E to which it is normally connected by way of the movable manually operated switch element 384 or from the source +E to which is is it is connected upon manual operation of switch 384. Manual operation to connect line 382 to the source +E is effected whenever the kiln exit oxygen measurement is not available for use. Such a condition would occur, for example, when the oxygen analyzer 260 is disconnected for maintenance purposes. Thus, it will be evident that the availability of the oxygen analyzer 206 is a condition of the kiln which must be considered in the determination of whether the control of the temperature in the burning zone is to be affected by the correction of the fuel feed rate or by altering the kiln speed.

Still another condition which will cause the OR gate 304 to produce a positive output signal is the existence of a positive input signal on both of the input lines of AND gate 390 representing the simultaneous occurrence of two separate conditions; namely, the calculated desired kiln speed being greater than the kiln speed set point and the temperature measured by the radiation pyrometer being greater than a preset low limit. The condition relating to the kiln speed is determined by comparator 392 so that there is produced on the output line 394 of comparator 392 an output signal of positive polarity whenever the signal −$KS_d$ on line 396 is greater in magnitude than the signal +$KS_o$ on line 398. The signal on line 396, which is one of the input signals for comparator 392, is derived from line 42 while the signal on line 398 is derived from the potentiometer 400, which is connected to a source +E and which is manually adjusted in accordance with the kiln speed set point.

The signal relating to the temperature detected in the burning zone is provided as an output from comparator 402 on line 404 so that there is a positive signal on line 404 whenever the signal −RLT occurring on line 406 is greater than the signal +$RLT_{l1}$ appearing on input line 408. The signal −RLT is derived from line 86 by way of sign-changing amplifier 410.

There has been explained above all the combinations and conditions of the kiln and its measuring equipment which will cause an output to be produced from gate 280 and likewise from gate 290 to switch the control from fuel feed to kiln speed whenever the control signal for the fuel feed calls for an increase in fuel feed.

There will now be explained the several conditions or combinations of conditions which will be effective to provide an output from gate 282 to cause a similar switching of the control from the fuel feed to the kiln speed whenever the control signal for the fuel feed rate is calling for a decrease and the desired kiln speed is below the high limit set for the kiln speed. The AND gate 420 will produce a positive signal on its output line 422 whenever the signal on line 298 is negative so that a positive signal appears on line 423 as a result of sign-changing amplifier 424. Thus, the signal on line 423 is positive whenever the change in fuel feed rate called for by the signal on line 176 is such that a decrease in fuel feed rate is required.

In order to enable gate 420 and produce a positive output signal on line 422, there must also appear a positive signal on line 430 which is the other input line to gate 420. The positive signal on line 430 is produced as an output for comparator 432 whenever the signal −$KS_H$ on input line 434 of comparator 432 is greater than the signal +$KS_d$ on input line 436 of comparator 432. The signal on line 434 is derived by way of potentiometer 438 from a potential source −E while the signal on line 436 is derived from line 42 by way of sign-changing amplifier 440.

Whenever gate 420 is enabled by the simultaneous appearance of positive signals on line 423 and 430 in order to enable gate 282 there must also appear a positive signal on its input line 444 as an output from the OR gate 446. A positive signal on any one of the three input lines to OR gate 436, namely, lines 382, 448, or 450, will produce a positive output signal on output line 444. The first condition of the three which are capable of enabling gate 282 when gate 420 is simultaneously enabled is the existence of a signal on line 382 which is positive in potential, as will be obtained when the kiln exit oxygen measurement is unavailable for use as previously mentioned.

The second condition which will enable gate 446 is the existence of a positive signal on linr 448 which will occur when there is a negative signal on line 394 by virtue of sign-changing amplifier 452. Thus, whenever the desired kiln speed represented by the signal −$KS_d$ is less in magnitude than the kiln speed set point +$KS_o$, the signal on line 448 will be positive.

The third condition which will enable gate 436 is the appearance of a positive signal on line 450 as an output from comparator 456 resulting from the signal +FR$_a$ being less in magnitude than the signal −FR$_L$, that is when the positive potential occurring on input line 458 is less than the negative potential appearing on line 460. The signal on line 458 representing the actual fuel feed rate is derived from line 80 while the signal on line 460 is derived from the potential source −E by way of potentiometer 464 which may be adjusted as desired to obtain a signal on line 460 indicative of the desired limit for the fuel feed rate.

There has now been described all the conditions and combinations of conditions which are necessary to produce a signal on line 292 which will energize relay 198 to switch the control of the burning zone temperature of the kiln from control of the fuel feed rate to control of the kiln speed. The signal on line 292 as mentioned is derived from the signal on line 288. This latter signal is also utilized as one of the inputs to the AND gate 464 whose other input is by way of line 466 from the comparator circuit 468.

The comparator circuit 468 is similar to the circuit 314 except that there is not included a diode comparable to diode 340. Thus, comparator 468 is effective to place a positive potential on line 466 whenever the input signal on line 479 is either above or below the input signal on line 480.

The signal on line 480 is adjusted by an adjustment of potentiometer 482 which derives its potential from the source +E so as to provide as an input to the variable resistor 484 a signal representative of the kiln speed set point KS$_0$. The other input to comparator 468 on line 479 is a signal representative of the desired kiln speed −KS$_d$ and is derived from line 42. The operation of comparator 468 is such that that whenever the signal on line 479 representing the desired kiln speed is substantially equal to the signal on line 480, representing the kiln speed set point there is a signal −E on output line 466. However, when the signal on line 479 departs in either direction from the kiln speed set point signal on line 480, a potential +E is placed on line 466. Thus, comparator 468 is a comparator for detecting when the desired kiln speed passes through the kiln speed set point. When such a condition occurs simultaneously with a signal calling for a change of control from fuel feed rate or kiln speed, as represented by the appearance of a positive signal on line 288, there is then produced a positive signal on line 488, which will cause the energization of relay 230. As previously mentioned, energization of relay 230 is effective to disconnect the reset line 224 of integrator 214 from a signal representing the kiln speed set point KS$_0$ so that the effect will be to control the kiln speed in accordance with the signal appearing on line 178. When the control is on fuel feed rate, the reset line 224 will be connected to receive the signal KS$_0$ so that the kiln speed will be controlled to its set point.

In FIG. 1B there is shown the logical circuitry for determining when the reset and rate control signals will be utilized and when the proportional control signal will be enhanced by adding to that signal as previously mentioned.

It has been found to be desirable in the control of the burning zone temperature of a rotary cement kiln to enhance the proportional action of the control as, for example, by doubling the magnitude of the proportional control signal whenever the temperature in the burning zone, as detected by the radiation pyrometer 18, deviates from its set point RLT$_0$ by an amount greater than a predetermined limit either in a high or low direction. It has also been found desirable to limit the reset control signal to being effective only within a predetermined band of temperatures about the set point temperature in order that excessive reset action will not be accumulated.

In addition, it has been found desirable to limit the rate action of the control to those periods when the temperature is decreasing below a high limit above the temperature set point or when it is increasing above a predetermined low limit established for the temperature set point.

In FIG. 1B the circuit is arranged so that the AND gate 500 produces a positive signal on line 502 which will be effective to energize relay 140 in FIG. 1A whenever there is simultaneously a positive signal on each of the input lines 504 and 506 of gate 500. A positive signal will appear on line 504 whenever the comparator 508 indicates that its input signal −RLT appearing on input line 510 is greater in magnitude than the other input signal RLT$_{L2}$ appearing on line 512. The signal appearing on line 510 is derived from line 86 by way of sign-changing amplifier 514 while the signal on line 512 is derived from the positive potential source +E by way of potentiometer 516.

A positive signal on line 506 is obtained whenever the comparator 520 receives an input signal RLT$_{H2}$ on input line 522 which is greater in magnitude than the signal +RLT appearing on the input line 524. The signal on line 524 is derived directly from line 586 while the signal on line 522 is derived from a negative potential source −E by way of potentiometer 526 which is adjusted in accordance with the desired high limit H2, the limits H2 and L2 being those between which it is desirable to utilize reset action.

The rate action is incorporated in the control whenever there is a positive signal appearing on line 530 which is the output line of the OR gate 532. A signal will be produced on line 530 whenever a positive signal appears on either of the input lines to 532; namely, lines 534 and 536.

Considering the signal produced on line 534, it will be evident that such a signal will be produced whenever the AND gate 538 is enabled by the simultaneous production of positive signals on lines 540 and 542.

A signal is produced on line 542 from comparator 546 whenever the signal on line 110 and its connecting line 548 is positive indicating that the temperature in the burning zone is increasing. The signal on line 548 is changed to an opposite sign by inverting amplifier 570 which connects to comparator 546.

A positive signal will be produced on line 540 whenever the signal −RLT on input line 550 of comparator 551 is greater in magnitude than the signal RLT$_3$ on line 552 indicating that the temperature in the burning zone is above the low limit L3. The signal on line 552 is derived from the source +E by way of potentiometer 554 which is adjusted to provide the limit signal L3. The signal on line 550 is derived from line 86 by way of sign-changing amplifier 558. From the above, it will be evident that there is produced a positive signal on line 534 whenever the temperature of the burning zone is increasing above the low limit L3.

A signal will be produced on line 536 whenever the temperature is decreasing below the high limit H3 in accordance with the circuit arrangement now to be explained. Line 536 is an output line of AND gate 560 and will receive a positive signal whenever there is simultaneously appearing on the input lines 562 and 564 positive signals from the respective comparators 566 and 568. The comparator 568 has as one of its inputs a signal derived from line 548 which will be such that there will be produced on input line 572 a negative signal whenever the burning zone temperature is decreasing. The other input line to comparator 568 is line 574 which is connected to ground.

A positive potential will appear on output line 562 of comparator 566 whenever the signal −RLT$_{H3}$ is greater than the signal +RLT, that is, whenever the signal on input line 578 is greater than that on line 580. As shown in FIG. 1B, the signal on line 578 is derived from the source −E by way of potentiometer 582 which is adjusted in accordance with the high limit H3 to establish the limit below which the temperature must be decreasing in order for the rate action to be effective.

Relay 120 of FIG. 1A is arranged to be energized whenever the temperature of the burning zone is above a high limit H1, thus, there must be produced on line 590 a positive signal for forward biasing diode 591 and thereby energizing relay 120 whenever the comparator 592 receives as one of its input signals an input signal −RLT on input line 594 which exceeds in magnitude the input signal RLT$_{H1}$ on input line 596. The signal on line 596 is derived from a source +E by way of adjustable potentiometer 598, which is adjusted in accordance with the desired magnitude of the high limit H1. The signal −RLT on line 594 is derived from line 86 by way of sign-changing amplifier 600, which connects line 86 to line 602, which is in turn connected to line 594.

When relay 120 is energized by the signal on line 590, the proportional control signal appearing on line 118 will be enhanced by the addition of a signal which will be determined by the constant K14. This enhancement of the proportional control signal is effective when the temperature is above the high limit H1. A similar enhancement of the proportional control signal will be made effective when the burning zone temperature is below a low limit $L_1$ by the addition of a signal to the proportional control signal by the energization of relay 130.

Energization of relay 130 will be effected by the production of a positive signal on line 606 from comparator 608 to forward bias diode 609 in line 606 whenever the signal on line 604 from sign reversing amplifier 603, namely, +RLT, is smaller in magnitude than the signal on input line 610, namely, $-RLT_{L1}$. The signal on line 610 is derived from a source of positive potential −E by way of potentiometer 612 which is adjusted to provide the desired signal on line 610 corresponding with the limit L1 while the signal on line 602 is derived as previously mentioned from line 86 by way of sign-changing amplifier 600.

Thus, relay 130 will be energized to enhance the proportional control signal whenever the burning zone temperature is below the low limit $L_1$.

It will be evident to those skilled in the art that the limits L1, L2, and L3, as well as the limits H1, H2, and H3 may each be different limits or they may represent the same magnitude of deviation from set point depending upon the requirements of the particular process. Likewise, it will be evident to those skilled in the art the constants K14 and K15 may be the same so that the proportional control signal is enhanced by the same amount when the temperature of the burning zone is above the high limit as when the temperature is below the low limit, or alternatively these constants may have different values so that the enhancement of the proportional control signal differs depending upon which limit has been exceeded.

The above description of FIGS. 1A, 1B, and 1C discloses a preferred analogue embodiment of the control system of the present invention. It is, of course, possible to alter the logical arrangements utilized for ascertaining when the control should be switched from one manipulated variable to the other and when the different control actions should be used or their magnitude changed without substantially changing the features of this invention.

Figure 2:
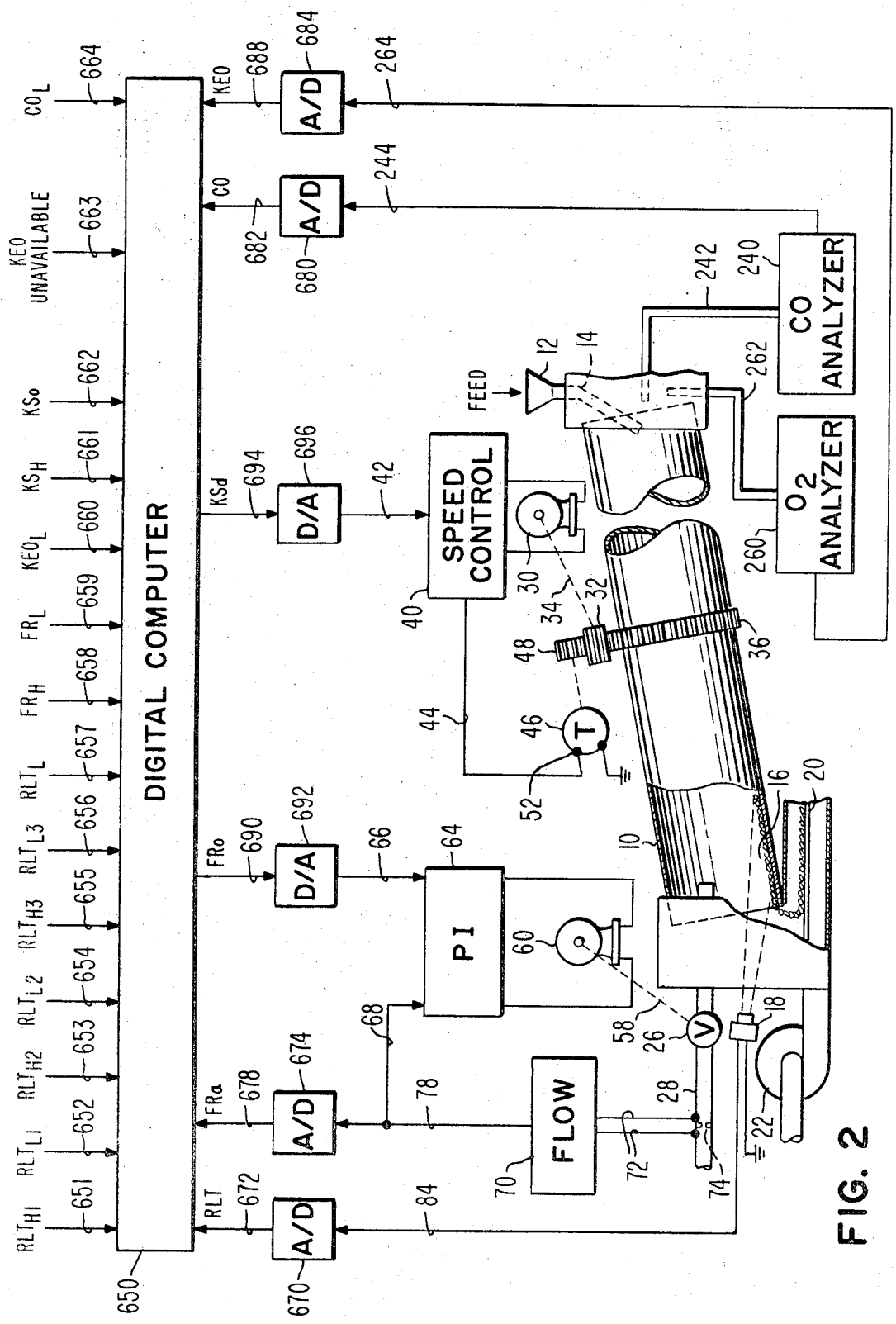
FIG. 2 is a block diagram of the novel control system in a form utilizing a digital computer for effecting the necessary data comparisons and resulting logical decisions necessary for proper control action.

Still another method which can provide the novel control of a cement kiln of the type described may be carried out as shown in FIG. 2, wherein there is utilized a digital computer as a means for making the many comparisons and logical decisions embodied in the analogue system of FIGS. 1A, 1B, and 1C. This digital computer-control system will now be described.

In FIG. 2 it will be noted that the local control loops for controlling the fuel feed through pipe 28 by adjustment of valve 26 is similar to that of FIG. 1A in that the controller 64 operates motor 60 and serves to position valve 26 by way of shaft 58 so that the flow of fuel in pipe 28, as measured by flowmeter 70, will equal the desired flow rate represented by the signal established on line 66; namely, $FR_o$. This is accomplished by positioning the valve 26 until the signal on line 68 representing the actual flow $FR_a$ is equal to the signal on line 66 representing signal $FR_o$.

Likewise, the kiln speed control loop of FIG. 2 is similar to that of FIG. 1A in that the speed controller 40 serves to cause the motor 30 to rotate and thus cause a rotation of the kiln 10 at a speed corresponding to the desired kiln speed as represented by the signal on line 42, $KS_d$. The speed controller 40 receives a feedback signal on line 44 from tachometer 46 so that the speed control 40 serves to maintain a balance between the signals on lines 42 and 44.

The digital computer 650 may be any of a number of general purpose digital computers, or if desired, could be a special purpose digital computer. Assuming that digital computer 650 is a general purpose computer, it will be evident that it could readily accomplish the comparisons between the several kiln conditions measured and detected and limit conditions set up in the memory of the computer. These limit conditions which are symbolically represented as signals being entered at the top of the digital computer in FIG. 2 are the same limit condition established in the circuit of FIG. 1. These signals are entered into the storage of the digital computer so that they are available for the necessary comparisons which must be made to the measured values which are shown as being entered at the bottom of the computer.

Thus, the signals introduced on lines 651—664 are signals which are entered prior to the operation of the kiln in accordance with the preset desired limit values which those signals represent in accordance with the corresponding symbolic notations. Normally, these signals will remain the same throughout a long period of kiln operation except for the signal on line 663 representing the unavailability of the kiln exit oxygen measurement. Periodically, depending upon when the kiln exit oxygen is available or not available, this signal will have to be changed so that the stored information on that condition will be periodically subject to being updated.

Each of the analogue signals representing the measurement of a particular condition of the kiln, which is to be used as an input to the digital computer 650, is converted from analogue form to digital form by an analogue-to-digital converter. For example, the signal on line 84 representing the output of the radiation pyrometer 18 which detects the temperature of the clinker in the burning zone 16 of kiln 10, is fed through the analogue-to-digital converter 670 to form on line 672 a digital signal representing the measured temperature RLT. In similar fashion, the signal on line 78, which is indicative of the actual fuel flow through pipe 28 as measured by flowmeter 70 from the differential pressure across orifice 74 is converted by way of analogue-to-digital converter 674 to a signal $FR_a$ in digital form on line 678.

The carbon monoxide analyzer 240 provides an analogue signal on line 244 representative of the carbon monoxide concentration in the kiln exit. This signal is converted by the analogue-to-digital converter 680 to a digital signal on line 682 representing CO.

The oxygen analyzer 260 similarly produces on line 264 an analogue signal representing the oxygen concentration in the kiln exit. This analogue signal is converted in analogue-to-digital converter 684 to a digital signal on line 688 representing KEO.

The digital computer will operate to scan the input lines 672, 678, 682, and 688 periodically and then it will operate to make the necessary comparisons such as those set forth in the description in the analogue system of FIGS. 1A, 1B, and 1C. As a result of these comparisons and the logical decisions resulting from them, there will be produced by the digital computer two output signals. The first output signal $FR_o$ is produced on line 690 and represents the set point value for the fuel feed rate, or in other words, the desired fuel feed rate through pipe 28. The digital signal on line 690 is converted by the digital-to-analogue converter 692 so as to produce a corresponding analogue signal on line 66.

The second output signal from the digital computer is a signal representing the desired kiln speed $KS_d$. This signal is produced on output line 694 and is converted by the digital-to-analogue converter 696 to a corresponding analogue signal which will appear on line 42 indicating the desired kiln speed to be established by kiln control 40.

An example of the comparisons to be made and the logical decisions to be made from these comparisons as well as the order in which these comparisons and decisions can be made, there is set forth below in the form of steps which could be the steps of the program of a general purpose digital computer those particular comparisons and decisions in one order in which they can be made to accomplish the desired computation of the output signals required on lines 690 and 694.

1. Calculate reset term of control equation.

2. Determine:
   Is temperature above low limit $L_2$ and below high limit $L_2$ 3. If 2 is "no," set reset term to zero.
4. If 2 is "yes," reset term remains at calculated value.
5. Store reset term.
6. Calculate standard proportional term of control equation.
7. Determine:
   Is temperature above high H1   H1
8. If 7 is "no," determine:
   Is temperature below low limit H1
9. If 8 is "no," proportional term remains at standard value.
10. If 8 is "yes," calculate new proportional term as product of constant K15 and standard value plus standard value.
11. If 7 is "yes," calculate new proportional term as product of constant K14 and standard value plus standard value.
12. Store proportional term.
13. Calculate rate term of control equation.
14. Determine:
    Is temperature decreasing below high limit H3 or increasing above low limit H3
15. If 14 is "no," rate term remains zero.
16. If 14 is "yes," set rate term to calculated value.
17. Store rate term.
18. Sum stored proportional term with the product of the stored reset term and constant K5 and with the product of the stored rate term and constant K6 to obtain the fuel rate correction term.
19. Measure kiln exit oxygen, carbon monoxide, actual fuel rate, temperature and check availability of oxygen measurement.
20. Determine:
    Does fuel rate correction term call for an increase
21. If 20 is "no," go to step 25.
22. If 20 is "yes," determine:
    a. Is oxygen measurement unavailable   or
    b. Is last desired kiln speed greater than kiln speed set point $KS_O$, and is temperature greater than low limit $L_1$ or
    c. Is there CO present in exit gases above limit $CO_H$   or
    d. Is actual fuel rate greater than its high limit $FR_H$   or
    e. Is oxygen less than its low limit $KEO_L$
23. If any of 22(a)—22(e) are "yes," go to step 31.
24. If 22(a)—22(e) are all not "yes," go to step 29.
25. Determine:
    Is last desired kiln $KS_d$ speed less than the kiln speed high limit $KS_H$
26. If 25 is "no," go to step 29.
27. If 25 is "yes," determine:
    a. Is last desired kiln speed $KS_d$ less than kiln speed set point $KS_O$' or
    b. Is fuel rate less than fuel rate low limit $FR_L$   or
    c. Is oxygen measurement unavailable
28. If any of 27(a)—27(c) are "yes," go to step 31.
29. Calculate fuel rate change by multiplying fuel rate correction term by constant K4 and store resulting value.
30. Set kiln speed change called for to zero and go to step 34.
31. Sum the stored proportional term with the product of the stored reset term and constant K9 and with the product of the stored rate term and constant K10.
32. Multiply sum from step 31 by constant K8 and store product as kiln speed change.
33. Set fuel rate change to zero.
34. Add the product of CO content of exit gases and constant K1 to fuel rate change.
35. Add the product of CO content of exit gases and constant K2 to the kiln speed change.
36. Sum the newly calculated kiln speed changes with all previous changes and the kiln speed set point to obtain desired kiln speed, $KS_d$.
37. Determine:
    Has kiln speed just passed through its set point
38. If 37 is "no," go to step 40.
39. If 37 is "yes," multiply resultant deviation from set point by constant K16 and add the product to the stored fuel rate change.
40. Sum the present fuel rate change with all previous changes and the initial value of fuel rate to obtain $FR_O$, the fuel rate set point.
41. Output $FR_O$ and $KS_d$ to associated digital-to-analogue converters and introduce resulting analogue signals into controllers for fuel rate and kiln speed control.

It will be evident to those familiar with the utilization of digital computers for computing and control in the processing industries that other and different programs could be utilized for accomplishing the same result as that accomplished by the program steps set forth above, and it will be also evident that, if desired, a special purpose computer could be constructed so that separate elements of the computer could accomplish each of the desired comparisons and logical decisions rather than utilizing a time sharing of the logic of the general purpose type of digital computer.

We claim:

1. The method for controlling a process in which at least two manipulated variables may be used to control a single measured variable and in which there are constraints on allowable variations of the process conditions modified by the manipulated variables comprising the steps of;
   producing an error signal representative of the deviation of said measured variable from its desired value,
   producing from said error signal another signal representative of the rate of change of said error signal,
   producing from said rate of change signal a control signal of magnitude indicative of the magnitude of the control action required for a preferred one of said manipulated variables to reduce said error signal to zero,
   producing a selection signal for effecting a selection of the variable to be controlled, said selection signal being such that a variable other than said preferred variable is selected when the control action called for by said control signal is of magnitude and direction such that control of the preferred variable could cause conditions of the process, subject to variations by changes in the preferred variable, to exceed preestablished constraints or when control of said other variable would cause the other variable to be controlled toward its set point,
   producing from said rate of change signal a control signal of magnitude indicative of the magnitude of the control action required for said other variable to reduce said error signal to zero when said selection signal is operative to select said other variable, and
   controlling the selected manipulated variable in response to that one of said control signals produced for the selected manipulated variable.

2. The method of claim 1 in which the process under control includes a rotary cement kiln and in which the measured variable is the burning zone temperature of the kiln; the manipulated variables are fuel feed rate and the kiln speed, the preferred variable being fuel feed rate.

3. The method of claim 2 in which the preestablished constraints include the unavailability of measurement of the kiln exit oxygen.

4. The method of claim 2 in which the preestablished constraints include a low limit on the burning zone temperature and a kiln speed above its set point when the control action called for by the control signal for the fuel feed rate calls for an increase.

5. The method of claim 2 in which the preestablished constraints include a low limit on the concentration of oxygen in the kiln exit when the control action called for by the control signal for the fuel feed rate calls for an increase.

6. The method of claim 2 in which the preestablished constraints include a high limit on the fuel feed rate when the control signal for the fuel feed rate calls for an increase.

7. The method of claim 2 in which the preestablished constraints include a high limit for the carbon monoxide concentration in the kiln exit when the control action called for by the control signal for the fuel feed rate calls for an increase.

8. The method of claim 2 in which the preestablished constraints include a low limit for the fuel feed rate when the computed desired kiln speed is below a high limit and the control action called for by the control signal for the fuel feed rate calls for a decrease.

9. A system for controlling a process in which at least two manipulated variables may be used to control a single measured variable and in which there are constraints on allowable variation of the process conditions modified by the manipulated variables comprising:
- means for producing an error signal representative of the deviation of said measured variable from its desired value,
- means for producing from said error signal another signal representative of the rate of change of said error signal,
- means for producing from said rate of change signal a control signal of magnitude indicative of the magnitude of the control action required for a preferred one of said manipulated variables to reduce said error signal to zero,
- means for producing a selection signal for effecting a selection of the variable to be controlled, said means for producing a selection signal being operative to select a variable other than said preferred variable when the control action called for by said control signal is of magnitude and direction such that control of the preferred variable would cause conditions of the process, subject to variations by changes in the preferred variable, to exceed preestablished constraints and when control of said other variable would cause the other variable to be controlled toward its set point,
- means for producing from said rate of change signal a control signal of magnitude indicative of the magnitude of the control action required for said other variable to reduce said error signal to zero when said selection signal is operative to select said other variable, and
- means for controlling the selected manipulated variable in response to said control signal.

10. The system of claim 9 in which the process under control includes a rotary cement kiln and in which the measured variable is burning zone temperature and the manipulated variables are fuel feed rate and kiln speed, the preferred variable being fuel feed rate.

11. The system of claim 10 in which the preestablished constraints include the unavailability of measurement of the kiln exit oxygen.

12. The system of claim 10 in which the preestablished constraints include a low limit on the burning zone temperature and a kiln speed above its set point when the control action called for by the control signal for the fuel feed rate calls for an increase.

13. The system of claim 10 in which the preestablished constraints include a low limit on the concentration of oxygen in the kiln exit when the control action called for by the control signal for the fuel feed rate calls for an increase.

14. The system of claim 10 in which the preestablished constraints include a high limit on the fuel feed rate when the control signal for the fuel feed rate calls for an increase.

15. The system of claim 10 in which the preestablished constraints include a high limit for the carbon monoxide concentration in the kiln exit when the control action called for by the control signal for the fuel feed rate calls for an increase.

16. The system of claim 10 in which the preestablished constraints include a low limit for the fuel feed rate when the computed desired kiln speed is below a high limit and the control action called for by the control signal for the fuel feed rate calls for a decrease.

17. The method of controlling the temperature of the clinker in the burning zone in a rotary cement kiln comprising the steps of:
- establishing an error signal representative of the difference between the desired value for said temperature and its measured value,
- establishing from said error signal separate signals representing respectively a proportional control signal, a reset signal and a rate control signal,
- selecting one of the temperature changing manipulated variables, fuel feed rate and kiln speed variable, to be the controlled variable said selection being made in accordance with the conditions of said kiln and the direction of temperature change necessary, and
- controlling the selected one of the temperature changing manipulated variables in response to said control signals so as to tend to return said temperature to its desired value.

18. The method of control as called for in claim 17 in which the proportional control signal is enhanced by a predetermined factor whenever said error signal is beyond a predetermined limit value.

19. A method of control as called for in claim 17 in which the response to said reset control signal is discontinued when said error signal is outside a predetermined limit value.

20. The method of control as called for in claim 17 in which the response to said rate action is effective only when said error signal is increasing in value and said error signal is below a predetermined high limit value as well as when said error signal is decreasing in value and is above a predetermined low limit value.

21. The method called for in claim 17 in which the proportional control response is enhanced by a predetermined factor whenever said error signal is beyond predetermined high and low limit values; the response to said reset control signal is discontinued when said error signal is outside predetermined high and low limits and the response to said rate action is effective only when said error signal is increasing and is below a predetermined high limit as well as when said error signal is decreasing and is above a predetermined low limit.

22. A control system for controlling the temperature in the burning zone of a rotary cement kiln comprising:
- means for producing an error signal in response to the deviation of said temperature from its desired value,
- means responsive to said error signal for producing as separate signals a proportional control signal, a reset control signal and a rate control signal,
- means for selectively enhancing said proportional control signal by adding a signal which is a predetermined factor multiplied by said proportional control signal, when said error signal is below a predetermined limiting value, and
- means for normally controlling the fuel flow to said kiln in response to said proportional, reset and rate control signals when such control of the fuel flow will not adversely affect other conditions of the kiln, and for controlling kiln speed in response to said proportional, reset and rate control signals when said other conditions of the kiln will be adversely affected by a change in the fuel flow in response to said control signals.

23. The method for controlling the temperature of material being processed in a rotary kiln comprising the steps of:
- controlling one of the group of manipulated variables consisting of fuel feed rate and kiln speed to tend to maintain said temperature at a desired value,
- measuring the carbon monoxide in the exit gases of said kiln, and
- decreasing said fuel feed rate and decreasing said kiln speed by comparable amounts in response to an increase in the carbon monoxide in the exit gases of said kiln for preventing dangerous conditions in said kiln without substantially modifying said temperature.

24. The method for controlling the temperature of material being processed in a rotary kiln comprising the steps of:
- developing a control signal indicative of the magnitude and direction of change necessary for the fuel feed rate to tend to maintain said temperature at its desired value,
- controlling said fuel feed rate in response to said control signal when the conditions of the kiln process are such that upon a change in fuel feed rate in the direction called for, no undesirable results will occur,
- measuring the concentration of oxygen in the exit gases of the kiln, and controlling the kiln speed in response to said control signal when the conditions of the kiln process are such that, with the direction of change called for, undesirable results may occur if control is effected by changing the fuel feed rate, said conditions including the unavailability of said oxygen measurement at the kiln exit when the change called for is one which tends to result in an increase in temperature of said material.

25. The method for controlling the temperature of material being processed in a rotary kiln comprising the steps of:
   developing a control signal indicative of the magnitude and direction of change necessary for the fuel feed rate to tend to maintain said temperature at its desired value,
   controlling said fuel feed rate in response to said control signal when the conditions of the kiln process are such that upon a change in fuel feed rate in the direction called for, no undesirable results will occur,
   measuring the concentration of oxygen in the exit gases of the kiln, and
   controlling the kiln speed in response to said control signal when the conditions of the kiln process are such that, with the direction of change called for, undesirable results may occur if control is effected by changing the fuel feed rate, said conditions including the coincident occurrence of a computed value for the desired kiln speed which is less than the present high limit for said speed and the unavailability of said oxygen measurement at the kiln exit when the change in fuel feed rate called for is one which is intended to result in a decrease in the temperature of said material.

26. A control system for controlling the temperature in the burning zone of a rotary cement kiln comprising:
   means for producing an error signal in response to the deviation of said temperature from its desired value,
   means responsive to said error signal for producing as separate signals a proportional control signal, a reset control signal and a rate control signal,
   means for selectively enhancing said proportional control signal by adding a signal which is a predetermined factor multiplied by said proportional control signal, when said error signal is below a predetermined limiting value,
   measuring the concentration of oxygen in the exit gases of the kiln, and
   means for normally controlling the fuel flow to said kiln in response to said proportional, reset and rate control signals when such control of the fuel flow will not adversely affect other conditions of the kiln, and for controlling kiln speed in response to said proportional, reset and rate control signals when a control of the fuel flow would cause an increase in the fuel flow and the kiln exit oxygen measurement is unavailable.

27. The method for controlling the temperature of material being processed in a rotary kiln comprising the steps of:
   developing a control signal indicative of the magnitude and direction of change necessary for the fuel feed rate to tend to maintain said temperature at its desired value,
   measuring the oxygen concentration in the exit gases of said kiln,
   controlling said fuel feed rate in response to said control signal when the conditions of the kiln process are such that upon a change in fuel feed rate in the direction called for, no undesirable results will occur, and
   controlling the kiln speed in response to said control signal when the measured oxygen concentration in the kiln exit gases is less than a preset low limit established for that concentration when the change in fuel feed rate called for is one which would tend to result in an increase in the temperature of said material, whereby undesirable results from changing the fuel feed rate are avoided.

28. The method for controlling the temperature of material being processed in a rotary kiln comprising the steps of:
   developing a control signal indicative of the magnitude and direction of change necessary for the fuel feed rate to tend to maintain said temperature at its desired value,
   measuring the carbon monoxide concentration in the exit gases of said kiln,
   controlling said fuel feed rate in response to said control signal when the conditions of the kiln process are such that upon a change in fuel feed rate in the direction called for, no undesirable results will occur, and
   controlling the kiln speed in response to said control signal when the carbon monoxide concentration in the exit gases of the kiln are of magnitude above a predetermined limit value when the change in the fuel feed rate called for is one which is intended to result in an increase in the temperature of said material, whereby undesirable results from changing the fuel feed rate are avoided.